UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

STABLE HYDROGEN PEROXID.

1,002,854.  Specification of Letters Patent.  Patented Sept. 12, 1911.

No Drawing.   Application filed July 14, 1910.  Serial No. 572,006.

*To all whom it may concern:*

Be it known that I, OTTO LIEBKNECHT, a subject of the Emperor of Germany, residing at Frankfort-on-the-Main, Germany, have invented a new and useful Improvement in Stable Hydrogen Peroxid, of which the following is a specification.

The object of this invention is to produce a stable solution of hydrogen peroxid and a method of making the same. It is already known that by the addition of certain substances to a solution of hydrogen peroxid stability is obtained.

In a pending application Serial No. 463,192 filed November 18, 1908, I have described the preservation of hydrogen peroxid by the addition of 1 to 2 grams per liter of sulfanilic acid thereto. I have discovered that there is a whole group of substances other than those now known for this purpose which can be used to great advantage as a means for rendering hydrogen peroxid stable. This group has the common property that each of the substances belonging to it contains a carboxyl group bound on an aromatic radical. This discovery greatly enlarges the field of possibility for rendering hydrogen peroxid stable. As illustrations of substances belonging to this group which possess the property of rendering hydrogen peroxid stable, I mention benzoic acid, salicylic acid, phthalic acid and their derivatives. The addition of very small quantities of any of these substances shows surprising results as to stability, for example, the addition of one part per thousand of benzoic acid to a three per cent. of aqueous hydrogen peroxid solution (one part by weight 30% $H_2O_2$ and nine parts distilled water) after 12 weeks shows no loss in percentage of the hydrogen peroxid, while without such addition after 3 weeks 92.3% of the hydrogen peroxid is lost, after 4 weeks 99% of it is lost and after 12 weeks it is all lost. The addition of one part per thousand of salicylic acid shows a loss in 12 weeks of but five-tenths of one per cent. of hydrogen peroxid. The action of these substances is also effective for aqueous solutions of hydrogen peroxid of any other concentration and various proportions thereof may be added to hydrogen peroxid solutions of various degrees of concentration without departing from the spirit of my invention.

I do not restrict myself to either the specific bodies or the specific proportions set forth.

What I claim and desire to secure by Letters Patent is:

1. A hydrogen peroxid solution containing a substance which in turn contains a carboxyl group combined with an aromatic radical.

2. A hydrogen peroxid solution containing benzoic acid.

In testimony whereof I have signed this specification in the presence of two subscribing witnesses.

OTTO LIEBKNECHT.

Witnesses:
JEAN GRUND,
CARL GRUND.